United States Patent
Hattori

(10) Patent No.: US 10,077,584 B2
(45) Date of Patent: Sep. 18, 2018

(54) ACTUATOR

(71) Applicant: NIFCO INC., Yokohama-shi, Kanagawa (JP)

(72) Inventor: Kenji Hattori, Yokohama (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 606 days.

(21) Appl. No.: 14/400,183

(22) PCT Filed: May 10, 2013

(86) PCT No.: PCT/JP2013/002998
§ 371 (c)(1),
(2) Date: Nov. 10, 2014

(87) PCT Pub. No.: WO2013/168433
PCT Pub. Date: Nov. 14, 2013

(65) Prior Publication Data
US 2015/0137527 A1 May 21, 2015

(30) Foreign Application Priority Data

May 11, 2012 (JP) .................... 2012-109139

(51) Int. Cl.
*E05B 83/30* (2014.01)
*E05B 81/06* (2014.01)
(Continued)

(52) U.S. Cl.
CPC .............. *E05B 83/30* (2013.01); *E05B 81/06* (2013.01); *E05B 81/50* (2013.01); *F16H 19/02* (2013.01);
(Continued)

(58) Field of Classification Search
CPC .......... Y10T 292/0823; Y10T 292/0843; Y10T 292/0966; Y10T 292/0993;
(Continued)

(56) References Cited

U.S. PATENT DOCUMENTS 4,921,288 A * 5/1990 Cifuentes ............... E05B 81/25
292/114
5,065,884 A * 11/1991 Naritomi ............... B65D 43/26
220/264
(Continued)

FOREIGN PATENT DOCUMENTS

DE 10240552 A1 3/2004
JP 2002-081237 A 3/2002
(Continued)

OTHER PUBLICATIONS

PCT, "International Search Report for PCT/JP2013/002998".
Europe Patent Office, "Search Report for European Patent Application No. 13788108.2," dated Jan. 24, 2017.

*Primary Examiner* — Christine M Mills
(74) *Attorney, Agent, or Firm* — Manabu Kanesaka

(57) ABSTRACT

An actuator includes an electric motor, a power transmission mechanism having a worm provided in a motor rotating shaft of the electric motor and a worm wheel engaging the worm, a drive member connected to the motor rotating shaft through the power transmission mechanism and displaced according to a rotation of the motor rotating shaft, a control device determining a rotational range of the motor rotating shaft between an initial position and a driven position, and an urging device provided in the motor rotating shaft and urging the motor rotating shaft to the initial position. In case electricity is supplied to the electric motor, the motor rotating shaft rotates to the driven position against an urging force of the urging device, and in case the electricity is not
(Continued)

supplied to the electric motor, the motor rotating shaft is urged by the urging device to rotate to the initial position.

8 Claims, 10 Drawing Sheets

(51) Int. Cl.
*F16H 19/02* (2006.01)
*E05B 81/50* (2014.01)
*H02K 23/02* (2006.01)
*F16H 1/16* (2006.01)
*F16H 25/20* (2006.01)
*F16H 19/04* (2006.01)
*E05B 81/34* (2014.01)
*E05C 9/04* (2006.01)

(52) U.S. Cl.
CPC .............. *H02K 23/02* (2013.01); *E05B 81/34* (2013.01); *E05C 9/043* (2013.01); *F16H 1/16* (2013.01); *F16H 2019/046* (2013.01); *F16H 2025/2068* (2013.01); *Y10T 74/18792* (2015.01); *Y10T 292/1021* (2015.04)

(58) Field of Classification Search
CPC ........... Y10T 292/1018; Y10T 292/307; Y10T 292/308; Y10T 292/1021; Y10T 74/18824; E05C 9/041; E05C 9/021; E05C 9/12; E05B 2047/002; E05B 2047/0021; E05B 2047/0022; E05B 2047/0016; E05B 53/008; E05B 81/34; E05B 81/36; E05B 81/38; E05B 83/28; E05B 83/30; E05B 47/0001; E05B 47/0012; E05B 81/06; E05B 81/81; E05B 15/04; E05B 2015/042; E05B 2015/0458; E05B 2015/0444; F16H 19/02; F16H 1/16; F16H 2025/2068
USPC ......... 292/22, 160, 172, 142, 279, 280, 144, 292/DIG. 61, 32–43; 74/89.19, 89.13, 74/89.14, 89.16, 89.17, 29, 109
See application file for complete search history.

(56) References Cited

U.S. PATENT DOCUMENTS

| | | | | |
|---|---|---|---|---|
| 5,214,332 A * | 5/1993 | Tsutsumi | ............... | E05B 81/25 292/336.3 |
| 5,222,774 A * | 6/1993 | Fukumoto | ............ | E05L 381/14 292/144 |
| 5,950,765 A * | 9/1999 | Pearson | .................. | F16H 19/00 185/40 R |
| 6,095,488 A * | 8/2000 | Semeyn, Jr. | ............ | F02D 11/10 185/40 R |
| 6,155,533 A * | 12/2000 | Semeyn | ................ | F02D 11/107 123/396 |
| 6,276,664 B1 * | 8/2001 | Keller | ..................... | F02D 11/10 251/129.12 |
| 6,494,505 B2 * | 12/2002 | Kobayashi | .............. | E05B 85/01 292/201 |
| 7,000,592 B2 * | 2/2006 | Katsuragawa | .......... | F02D 11/10 123/198 DC |
| 7,036,852 B2 * | 5/2006 | Cho | ........................ | E05B 83/30 292/142 |
| 7,475,929 B2 * | 1/2009 | Yamada | ................ | E05B 63/248 296/24.34 |
| 7,624,657 B2 | 12/2009 | Safran et al. | | |
| 7,878,035 B2 * | 2/2011 | Yamaguchi | ............... | B60R 7/06 200/43.11 |
| 8,453,810 B2 | 6/2013 | Okabayashi | | |
| 2001/0015305 A1 * | 8/2001 | Spurr | ...................... | E05B 81/25 185/40 R |
| 2004/0025609 A1 * | 2/2004 | Mann | ...................... | F02D 11/10 74/29 |
| 2004/0129102 A1 * | 7/2004 | Rennen | ................. | F02D 9/1065 74/425 |
| 2006/0137414 A1 * | 6/2006 | Denison | ............. | E05B 47/0012 70/257 |
| 2008/0053808 A1 * | 3/2008 | Peffley | .................. | F16K 31/047 200/400 |
| 2009/0038352 A1 * | 2/2009 | Yamaguchi | ............... | B60R 7/06 70/237 |
| 2011/0265586 A1 * | 11/2011 | Perkins | ................... | E05B 81/06 74/89.14 |
| 2012/0047807 A1 * | 3/2012 | Lee | ........................ | B60K 15/05 49/349 |
| 2012/0153641 A1 | 6/2012 | Watanabe | | |

FOREIGN PATENT DOCUMENTS

| | | |
|---|---|---|
| JP | 2003-056434 A | 2/2003 |
| JP | 2008-175347 A | 7/2008 |
| JP | 2010-001920 A | 1/2010 |
| WO | 2008/008603 A2 | 1/2008 |
| WO | WO-2012132546 A1 * 10/2012 | ............. E05B 63/14 |

\* cited by examiner

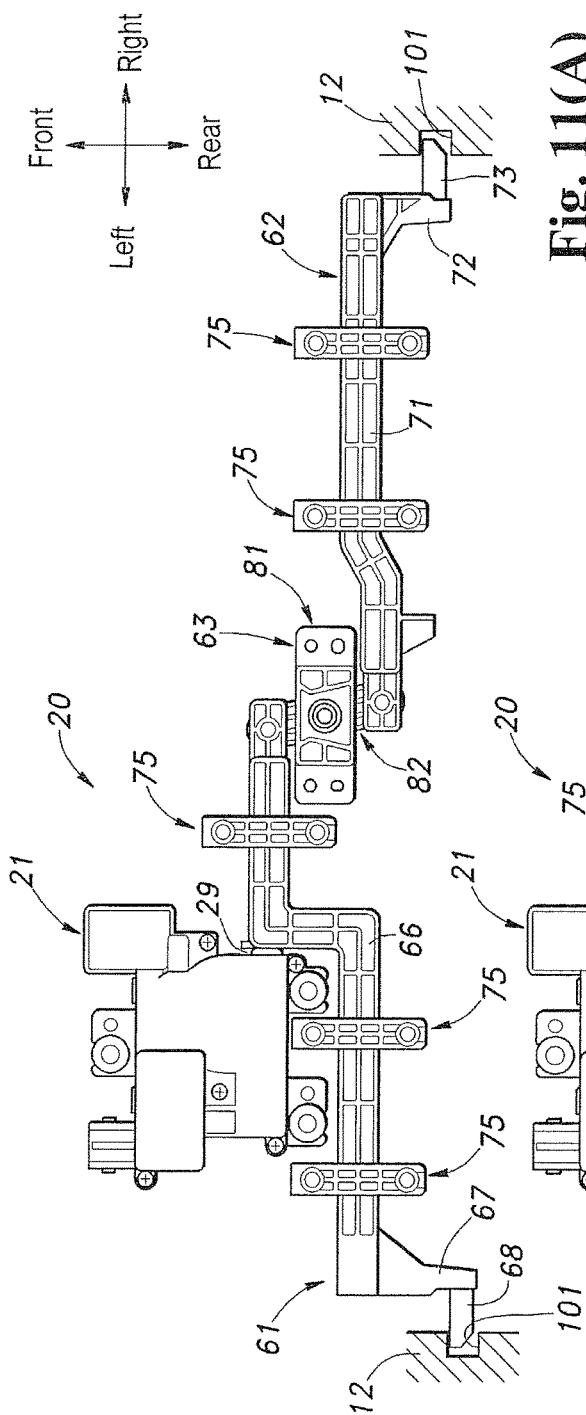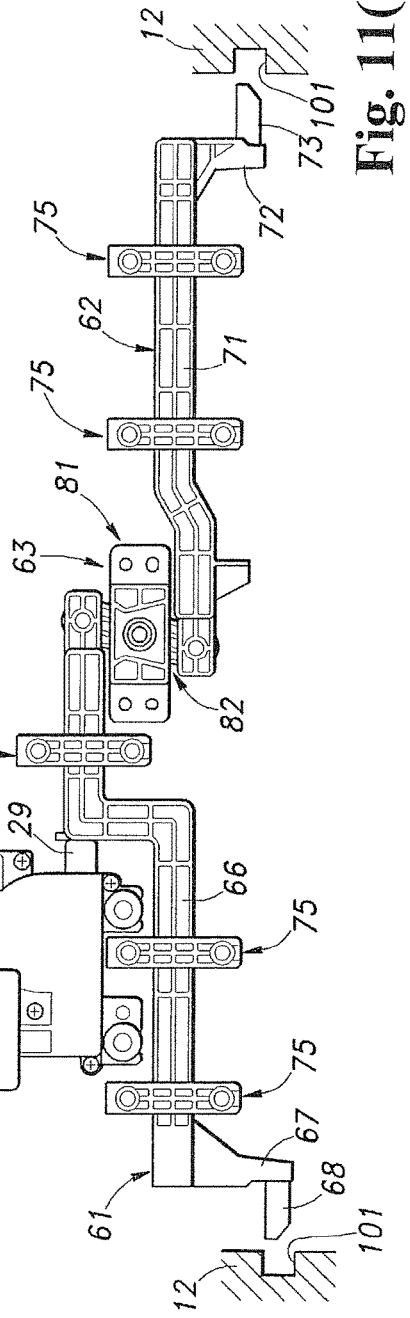

ACTUATOR

RELATED APPLICATIONS

The present application is National Phase of International Application No. PCT/JP2013/002998 filed May 10, 2013, and claims priority from Japanese Application No. 2012-109139, filed May 11, 2012.

FIELD OF TECHNOLOGY

The present invention relates to an actuator, and is used for, for example, a lock device of a glove box of an automobile.

BACKGROUND ART

In the glove box of the automobile, there is provided a lock device driven by an actuator, and the actuator is driven by a signal by a switch operation or a signal by an ECU to select to lock or unlock a lid body. Such actuator used for the lock device includes an electric motor; a power transmission mechanism including a worm provided in a motor rotating shaft of the electric motor and a worm wheel engaging with the worm; a drive member connected to the motor rotating shaft through the power transmission mechanism, and displaced according to a rotation of the motor rotating shaft; a control device determining a rotational range of the motor rotating shaft between an initial position and a driven position; a spiral spring provided in the worm wheel and urging the worm wheel to rotate the motor rotating shaft to an initial position side; and a coil spring provided in the drive member, and urging the drive member to rotate the motor rotating shaft to the initial position side (for example, Patent Document 1). In such an actuator, a motor is rotated normally by supplying electricity, and the motor is rotated reversely by urging forces of the spiral spring and the coil spring by stopping an electricity supply.

PRIOR ART DOCUMENT

Patent Document

Patent Document 1: Japanese Patent Application Publication No. 2010-1920

SUMMARY OF THE INVENTION

Problems to be Solved by the Invention

In the power transmission mechanism by the worm and the worm wheel, usually, the worm becomes an input side to obtain a large deceleration ratio. On the other hand, the worm wheel can become the input side by setting a torsional angle of the worm to be larger than a repose angle. However, in that case, in order to rotate the worm, it is necessary to apply a large input to the worm wheel. In the actuator described in the Patent Document 1, there are provided the spiral spring and the coil spring on a worm wheel side, so that the spiral spring and the like are required to generate a large urging force in order for the worm and the motor rotating shaft to be displaced to the initial position so as to have a problem of an increase in size. Also, since the drive member can be displaced by applying a load to the drive member, there is a problem that maintaining a lock state reliably becomes difficult.

The present invention is made in view of the aforementioned backgrounds, and an object of the present invention is to provide an actuator which has a simplified and compact structure, and can reliably maintain the drive member in a predetermined position, and a glove box using the same.

Means for Solving the Problems

In order to obtain the aforementioned objects, the present invention is an actuator (21), and comprises an electric motor (26); a power transmission mechanism (28) including a worm (33) provided in a motor rotating shaft (27) of the electric motor, and a worm wheel (34) engaging with the worm; a drive member (29) connected to the motor rotating shaft through the power transmission mechanism, and displaced according to a rotation of the motor rotating shaft; control devices (43 and 47) determining a rotational range of the motor rotating shaft between an initial position and a driven position; and an urging device (41) provided in the motor rotating shaft, and urging the motor rotating shaft to the initial position. In a case wherein electricity is supplied to the electric motor, the electric motor is driven, and the motor rotating shaft rotates to the driven position against an urging force of the urging device. On the other hand, in a case wherein the electricity is not supplied to the electric motor, the motor rotating shaft is urged by the urging device to rotate to the initial position.

According to the structure, the urging device is provided at the motor rotating shaft without through the worm wheel, so that the urging device can rotate the motor rotating shaft by a relatively small urging force. Therefore, the urging device can be reduced in size. Also, it is not required to rotate the worm and the motor rotating shaft through the worm wheel, so that a torsional angle of the worm can be set to be smaller than a repose angle so as to prevent the rotation of the motor rotating shaft by an input from a drive member side.

In the present invention, the urging device may include a first gear (38) provided in the motor rotating shaft; a second gear (39) engaging with the first gear; and a spring (41) rotating and urging the second gear.

According to the structure, using a deceleration ratio by the first gear and the second gear, the spring can be reduced in size.

In the present invention, preferably, the first gear is provided on a tip side of the motor rotating shaft more than the worm, and the second gear is provided on a side opposite to the worm wheel around a shaft line of the motor rotating shaft.

According to the structure, the second gear and the worm wheel are disposed to sandwich the motor rotating shaft, so that the second gear supports the motor rotating shaft relative to a load applied to the motor rotating shaft from the worm wheel so as to prevent the motor rotating shaft from bending.

Also, in the present invention, the urging device may be the spring provided in the motor rotating shaft, and rotating and urging the rotating shaft. Also, the spring may be a flat spiral spring (41).

Also, the present invention is a glove box using the aforementioned actuator, and includes a box body (7) opening one side, and a lid body (8) opening and closing the box body (7). In one of either the box body or the lid body, there are provided the actuator and a lock member (61) which is provided displaceably by the drive member of the actuator, and in the other of either the box body or the lid body, there is formed a fit hole (101) into which the lock member is fittable.

According to the structure, the glove box can be formed to be simplified and compact, and the lock member is prevented from being displaced unintentionally relative to an external force applied to the lock member.

Effect of the Invention

According to the aforementioned structure, an actuator which has a simplified and compact structure, and can reliably maintain the drive member in a predetermined position, and a glove box using the same can be provided.

BRIEF DESCRIPTION OF THE DRAWINGS

FIG. 11(A) is an explanatory drawing showing a lock state of a lock device,
and FIG. 11(B) is an explanatory drawing showing an unlock state of the lock device.

BEST MODES OF CARRYING OUT THE INVENTION

Hereinafter, with reference to the drawings, an actuator and a glove box using the actuator according to embodiments of the present invention will be explained. A glove box 1 according to the present embodiment is incorporated in an instrument panel of a passenger driver's seat of an automobile.

Figure 1:
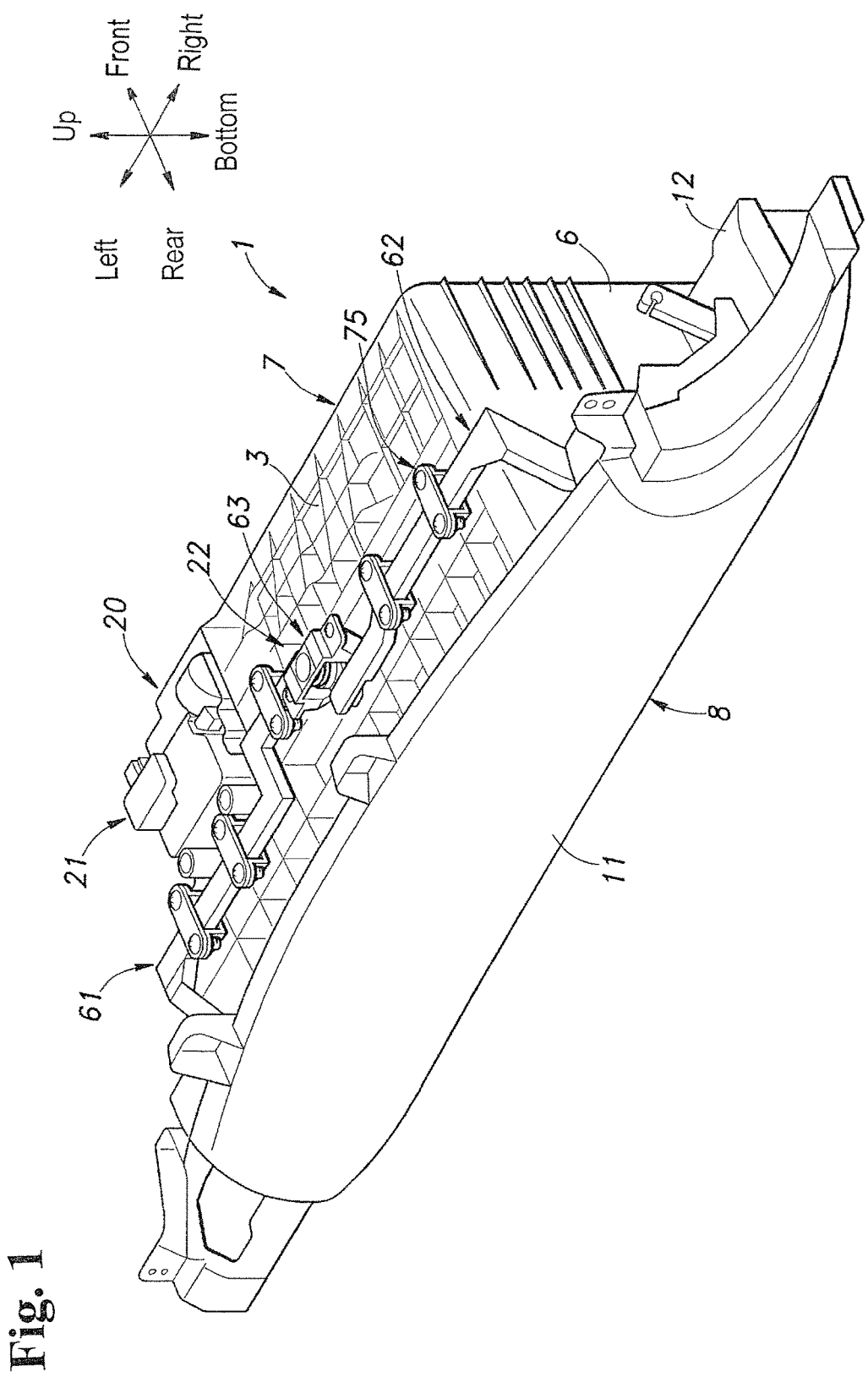
FIG. 1 is a perspective view showing a glove box.
Figure 2:
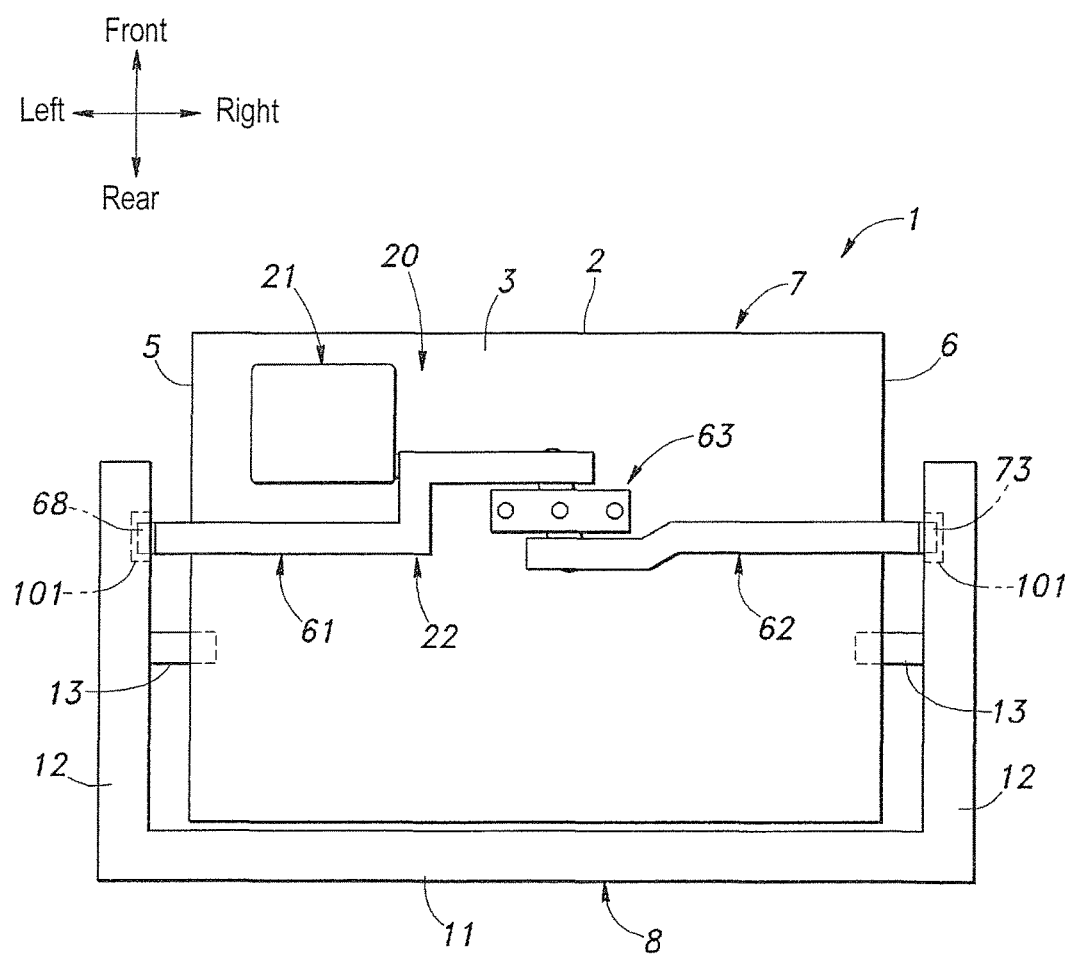
FIG. 2 is a plan view showing the glove box schematically.
Figure 3:
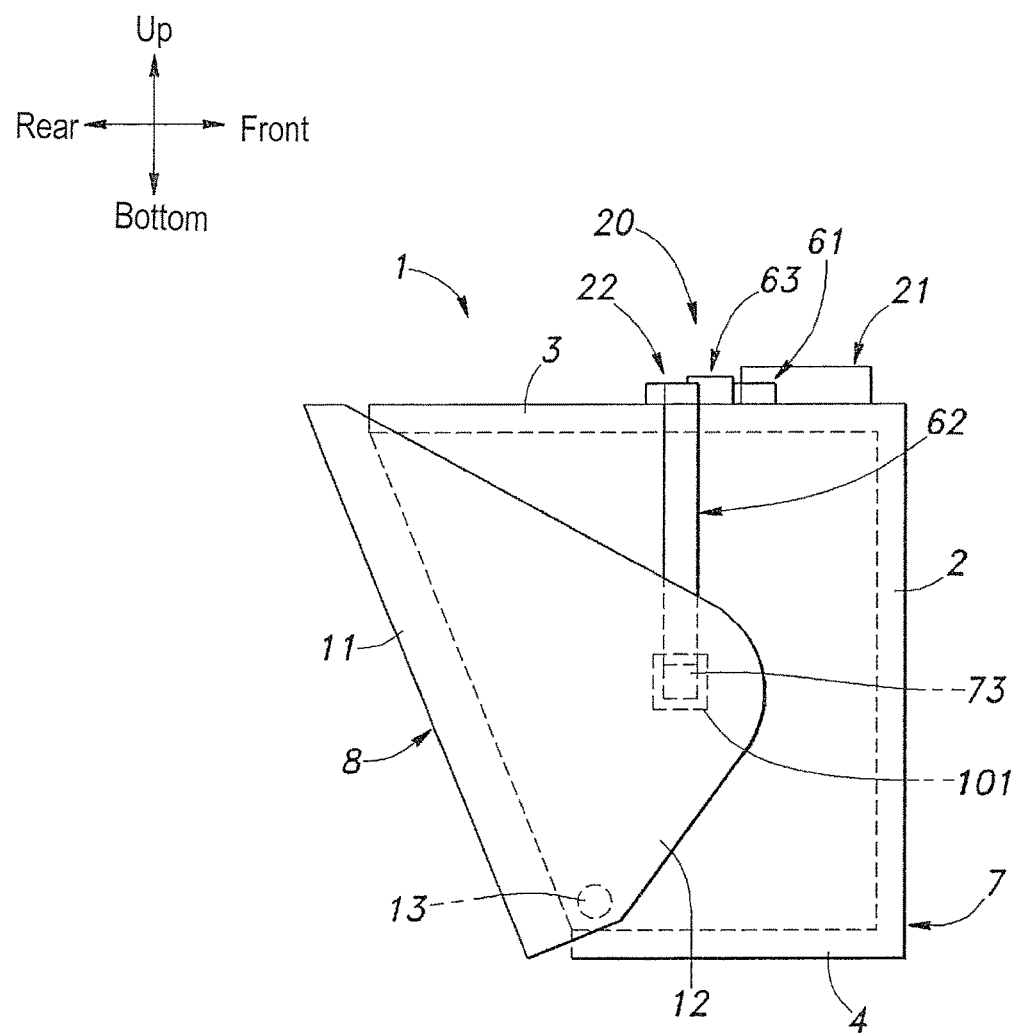
FIG. 3 is a right side view showing the glove box schematically.

As shown in FIG. 1 to FIG. 3, the glove box 1 includes a box body 7 including a front side wall 2, an upper wall 3, a lower wall 4, a left side wall 5, and a right side wall 6, wherein the upper wall, the lower wall, left and right side walls respectively extend backward from an upper edge, a lower edge, a left side edge, and a right side edge of the front side wall 2, and opening backward (a vehicle interior side); and a lid body 8 opening and closing an opening of the box body 7. The lid body 8 includes a plate-like lid main body portion 11 which can close the opening, and a right-and-left pair of arm portions 12 respectively protruding forward from right and left side edges of the lid main body portion 11. The pair of arm portions 12 respectively extends to an outside of the left side wall 5 or the right side wall 6. In a portion facing the left side wall 5 or the right side wall 6 of each arm portion 12, there are provided pivots 13 protruding to become coaxial, respectively. The pivot 13 of each arm portion 12 is pivotally supported at a lower portion of the left side wall 5 or the right side wall 6, so that the lid body 8 is turnably supported in the box body 7 so as to open and close the opening of the box body 7.

On an upper face of the upper wall 3 of the box body 7, there is provided a lock device 20. The lock device 20 includes an actuator 21 attached to the upper face of the upper wall 3, and a lock mechanism 22 driven by the actuator 21.

Figure 4:
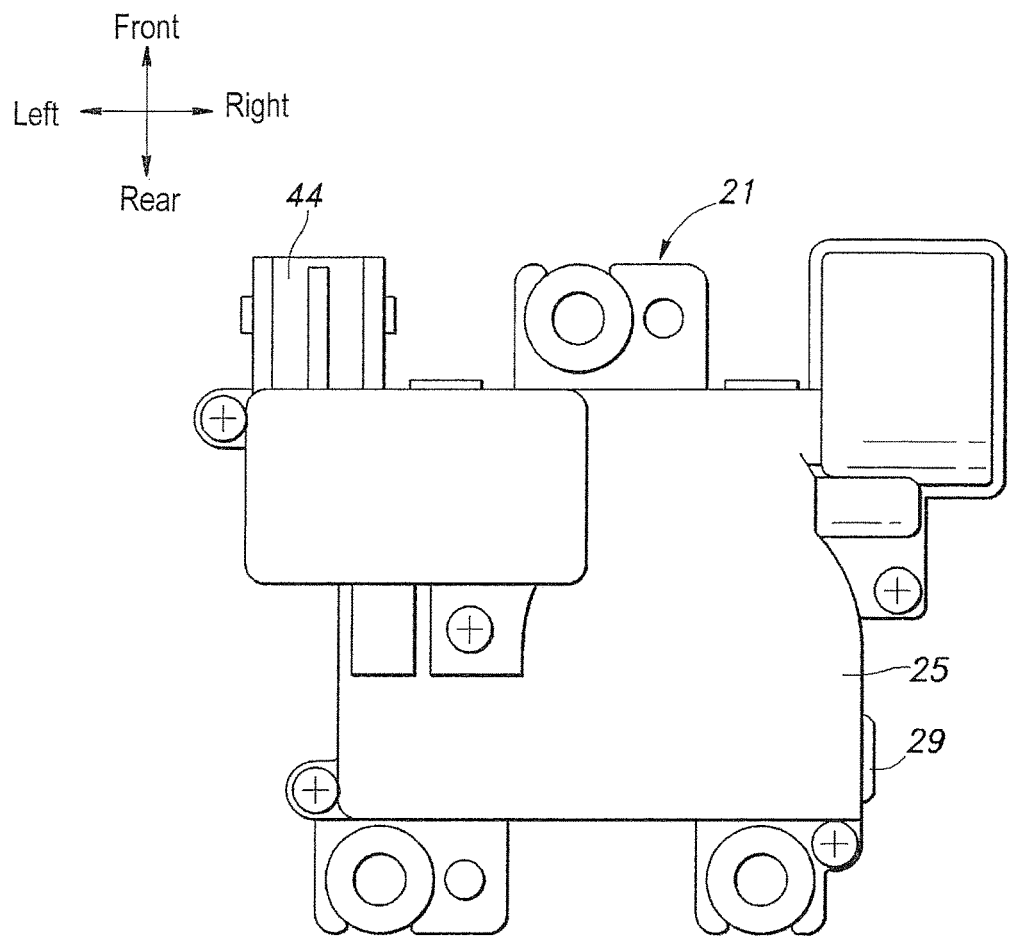
FIG. 4 is a plan view of an actuator.
Figure 5:
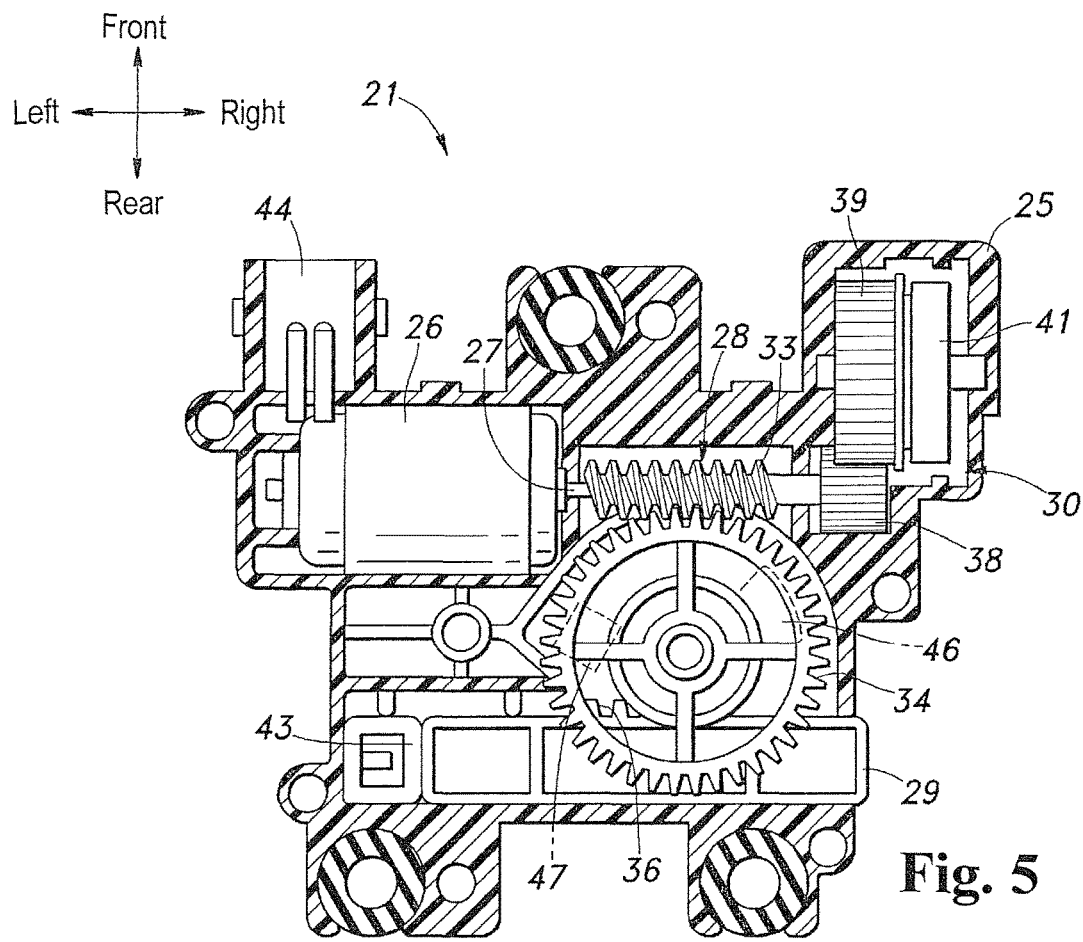
FIG. 5 is a cross-sectional view of the actuator.

As shown in FIG. 4 and FIG. 5, the actuator 21 includes a casing 25; an electric motor 26 supported inside the casing 25; a power transmission mechanism 28 connected to a motor rotating shaft 27 which is a rotating shaft of the electric motor 26, and transmitting a rotation of the motor rotating shaft 27; a drive member 29 connected to the motor rotating shaft 27 through the power transmission mechanism 28; and an urging mechanism 30 rotating and urging the motor rotating shaft 27 to one side. The drive member 29 has a cuboid shape extending in one direction, and is supported in the casing 25 slidably along a longitudinal direction. In the drive member 29, one end (hereinafter, called an outer end, and an end portion on an opposite side is called an inner end) in the longitudinal direction protrudes from a slide portion of the casing 25, and the drive member 29 is retractable from the casing 25 by moving forward and backward. The power transmission mechanism 28 includes a worm 33 connected to the motor rotating shaft 27, and integrally rotating with the motor rotating shaft 27; a worm wheel 34 rotatably supported in the casing 25, and engaging with the worm 33; a pinion 35 (see FIG. 6) formed coaxially with the worm wheel 34, and integrally rotating with the worm wheel 34; and a rack 36 formed on a side face of the drive member 29, and engaging with the pinion 35. The drive member 29 moves forward and backward linearly in association with the rotation of the motor rotating shaft 27 by the power transmission mechanism 28.

At a tip side more than a portion where the worm 33 of the motor rotating shaft 27 is provided, there is integrally formed a first gear 38 coaxially. In the first gear 38, there is engaged a second gear 39 rotatably supported in the casing 25. The second gear 39 is engaged with the first gear 38 in a position opposite to a position where the worm wheel 34 is engaged with the worm 33 relative to a center of the motor rotating shaft 27 when viewed from an axial direction of the motor rotating shaft 27. Thereby, in the motor rotating shaft 27, a reaction force receiving from the worm wheel 34 and a reaction force receiving from the second gear 39 face in mutually opposite directions. Also, the motor rotating shaft 27 is rotatably supported in the casing 25 on both outer sides of the portion where the worm 33 is provided.

There is provided a flat spiral spring 41 which is an urging device between the second gear 39 and the casing 25. In the flat spiral spring 41, while one end is connected to the second gear 39, the other end is connected to the casing 25, and the flat spiral spring 41 urges the second gear 39 in one rotational direction. Incidentally, in another embodiment, in place of the flat spiral spring 41, there may be applied a heretofore known urging member such as a torsion spring, a constant force spring, or the like.

An urging force by the flat spiral spring 41 is transmitted to the motor rotating shaft 27 through the second gear 39 and the first gear 38, and rotates the motor rotating shaft 27 in a first rotational direction. The motor rotating shaft 27 rotates in the first rotational direction, so that a rotating force thereof is transmitted to the drive member 29 through the worm 33, the worm wheel 34, the pinion 35, and the rack 36, and the drive member 29 is displaced in a direction of entering with respect to the casing 25. Inside the casing 25, there is provided a first stopper 43, and the other end (hereinafter, called the inner end) in the longitudinal direction of the drive member 29 abuts against the first stopper 43, so that a most entered position of the drive member 29 is determined. A state wherein the drive member 29 is positioned in the most entered position is an initial state of the actuator 21, and a position (an angle) of the motor rotating shaft 27 at that time is called an initial position.

In the casing 25, there is formed a connector 44 to which a harness from an ECU (an electronic control unit) is connected. In the connector 44, there is disposed a terminal connected to the electric motor 26.

When electricity is supplied, the electric motor 26 rotates the motor rotating shaft 27 in a second rotational direction opposing the first rotational direction. Namely, the electric motor 26 rotates the motor rotating shaft 27 against the urging force of the flat spiral spring 41. The motor rotating shaft 27 rotates in the second rotational direction, so that the rotating force thereof is transmitted to the drive member 29 through the worm 33, the worm wheel 34, the pinion 35, and the rack 36, and the drive member 29 is displaced in a direction of protruding with respect to the casing 25.

Figure 6:
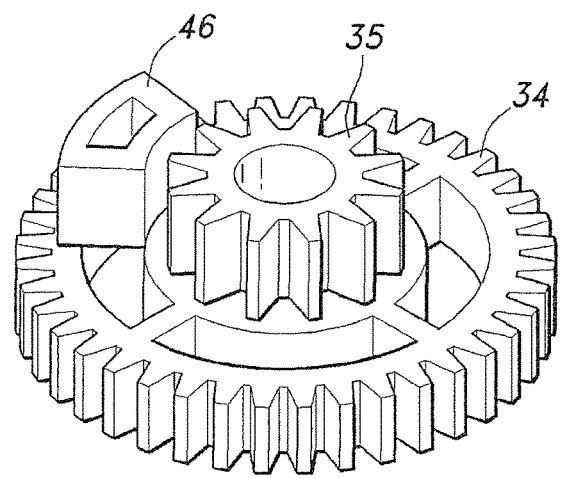
FIG. 6 is a perspective view in which a worm wheel is viewed from a lower side.

As shown in FIG. 6, on a side face of a pinion 35 side of the worm wheel 34, a convex wall 46 protrudes, and as shown in FIG. 5, in the casing 25, there is provided a second stopper 47. As shown in FIG. 5, the convex wall 46 and the second stopper 47 are spaced from each other in the initial state; however, in accordance with the motor rotating shaft 27 rotating in the second rotational direction, the convex wall 46 and the second stopper 47 come close to each other, and eventually abut against each other. The convex wall 46 and the second stopper 47 abut against each other, so that a rotation of the worm wheel 34 is controlled, and the rotation of the motor rotating shaft 27 in the second rotational direction is controlled. At that time, a position of the motor rotating shaft 27 is called a driven position, and a position of the drive member 29 is called a most protruding position. Thus, the first stopper 43 and the second stopper 47 function as control devices controlling a rotational range of the motor rotating shaft 27 between the initial position and the driven position.

With the aforementioned structure, in the actuator 21, in the initial state wherein the electricity is not supplied to the electric motor 26, the motor rotating shaft 27 is located in the initial position by the urging force of the flat spiral spring 41, and the drive member 29 is located in the most entered position. On the other hand, in the actuator 21, in a drive state wherein the electricity is supplied to the electric motor 26, the motor rotating shaft 27 is located in the driven position by a drive force of the electric motor 26 against the urging force of the flat spiral spring 41, and the drive member 29 is located in the most protruding position. The actuator 21 automatically changes from the drive state to the initial state by the urging force of the flat spiral spring 41 by stopping a supply of electricity to the electric motor 26.

As shown in FIG. 1, the casing 25 is attached to the upper face of the upper wall 3 of the box body 7 by a screw in such a way that the drive member 29 extends in a right-and-left direction and protrudes to a right side.

As shown in FIG. 1, the lock mechanism 22 includes a left lock member 61; a right lock member 62; and a link mechanism 63 connecting the right and left lock members 61 and 62. The left lock member 61 includes a left-lock-member upper portion 66 extending to approximately right and left on the upper face of the upper wall 3; a left-lock-member lower portion 67 extending downward while facing an outer face of the left side wall 5 from a left end of the left-lock-member upper portion 66; and a left lock claw portion 68 protruding to a left side from the left-lock-member lower portion 67. The left-lock-member upper portion 66 includes a crank portion at an intermediate portion in the right-and-left direction. The right lock member 62 includes a right-lock-member upper portion 71 extending to approximately right and left on the upper face of the upper wall 3; a right-lock-member lower portion 72 extending downward while facing an outer face of the right side wall 6 from a right end of the right-lock-member upper portion 71; and a right lock claw portion 73 protruding to a right side from the right-lock-member lower portion 72.

Figure 8:
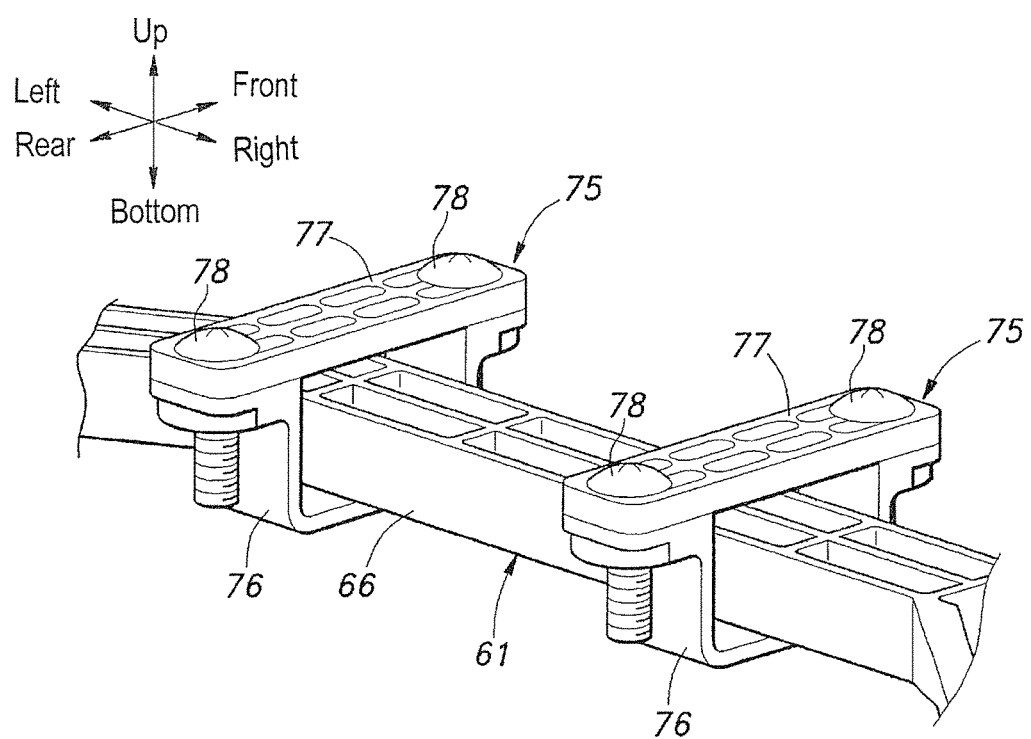
FIG. 8 is a perspective view showing a guide member supporting a left lock member.

The left-lock-member upper portion 66 and the right-lock-member upper portion 71 are supported by a plurality of guide members 75 connected to the upper wall 3 in extending portions to right and left respectively, and can slide in the right-and-left direction relative to the box body. As shown in FIG. 8, the guide member 75 includes a receiving member 76 with a groove shape (a U shape) opening upward; and a connection piece 77 closing an opening of an upper portion of the receiving member 76, and supports the left-lock-member upper portion 66 between the receiving member 76 and the connection piece 77 slidably in the right-and-left direction. The guide member 75 is connected to the upper wall 3 by a screw 78 passing through the connection piece 77 and the receiving member 76.

Figure 7:
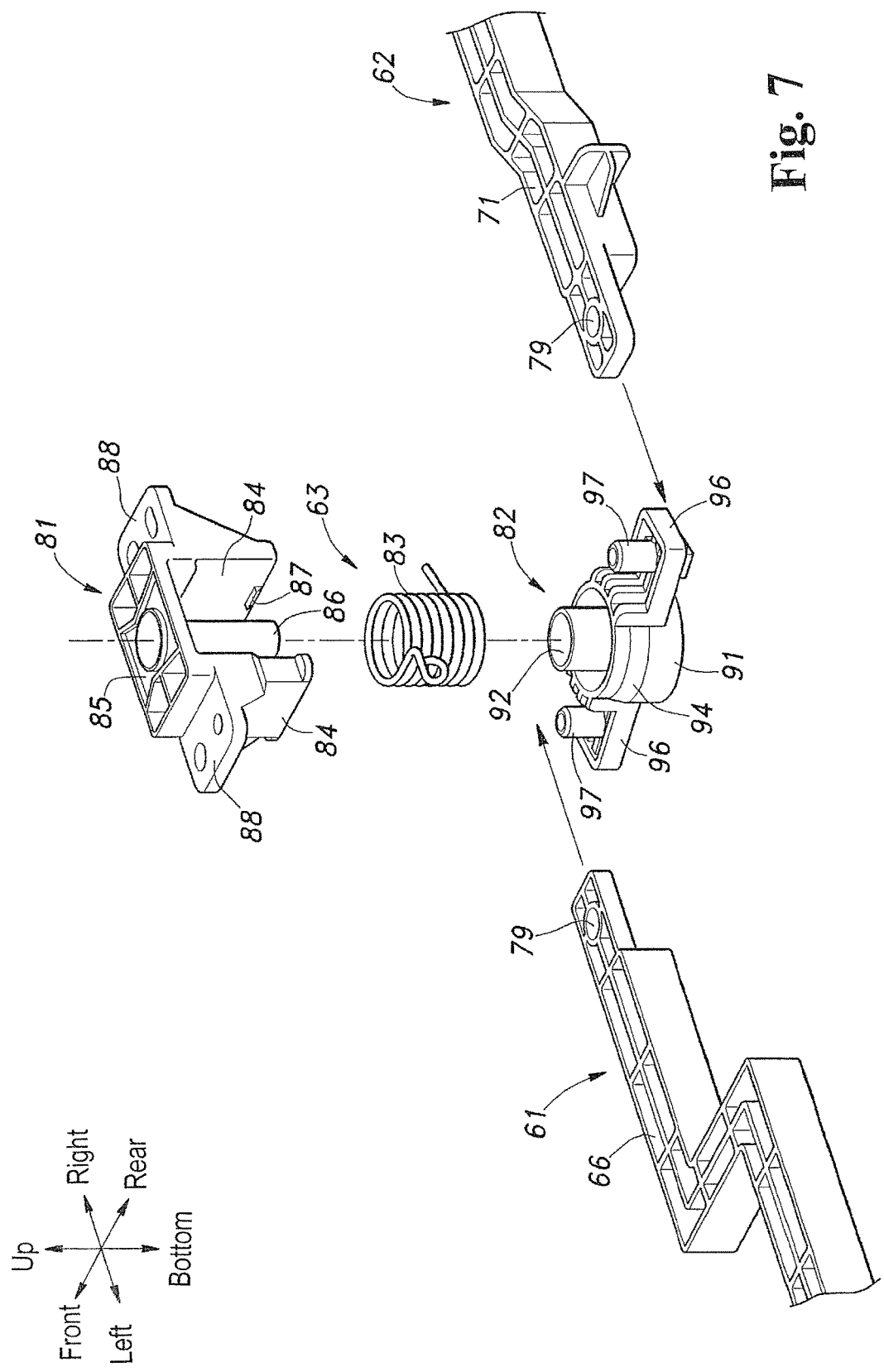
FIG. 7 is an exploded perspective view of a lock mechanism.

As shown in FIG. 7, in a right end portion of the left-lock-member upper portion 66 and a left end portion of the right-lock-member upper portion 71, respectively, there are formed locking holes 79 passing through in an up-and-down direction. The link mechanism 63 includes a support base 81; a link 82 rotatably supported in the support base 81; and a torsion coil spring 83 interposed between the support base 81 and the link 82, and urging the link 82 relative to the support base 81 in one rotational direction.

Figure 9:
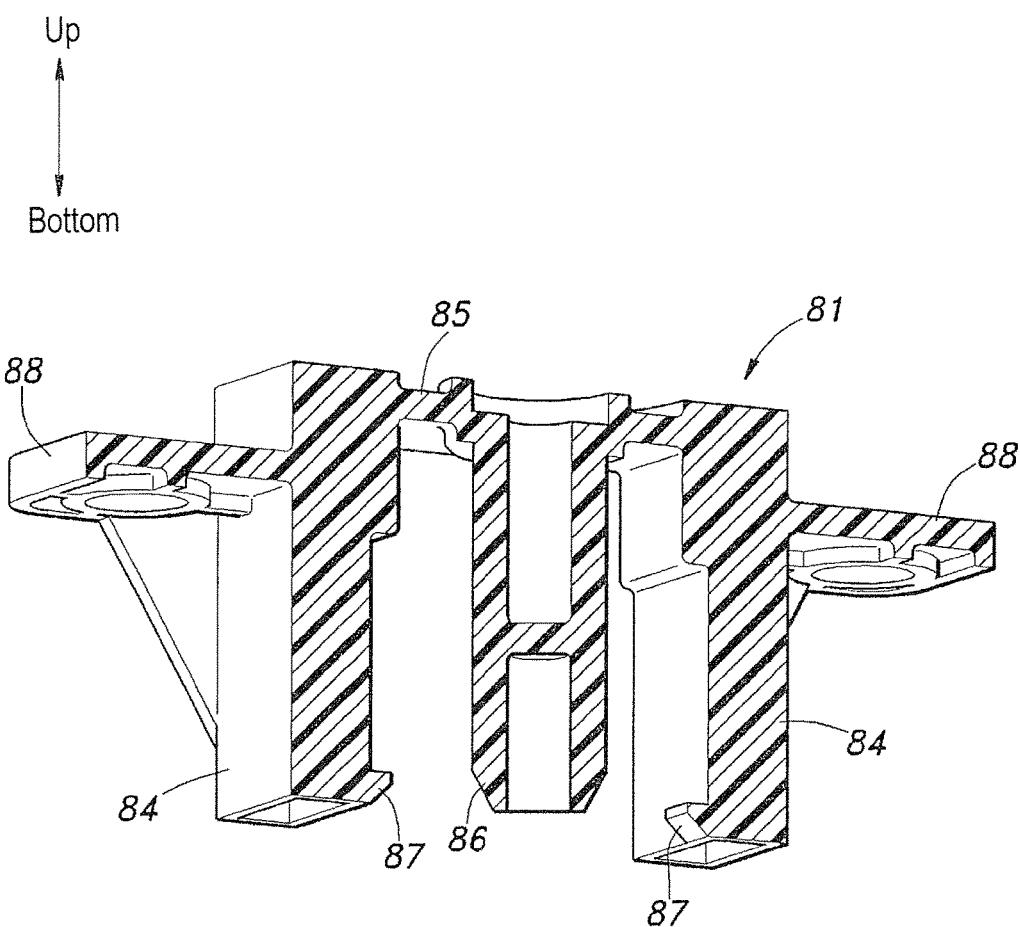
FIG. 9 is a cross-sectional perspective view of a support base.

As shown in FIG. 7 and FIG. 9, the support base 81 includes a pair of side walls 84, and an upper wall 85 connecting both upper ends of the pair of side walls 84, and is formed in a portal shape. On a lower face of the upper wall 85, there is provided a columnar support shaft 86 protruding downward between the pair of side walls 84. On mutually facing faces of the pair of side walls 84, respectively, there are provided locking claws 87 protruding in a direction of coming close to each other. On the mutually opposite sides of the faces of the pair of side walls 84, there are provided fastening pieces 88 in which through holes are formed to pass through in the up-and-down direction. The support base 81 is fastened to the upper wall 3 by screws passing through the through holes of the fastening pieces 88.

Figure 10:
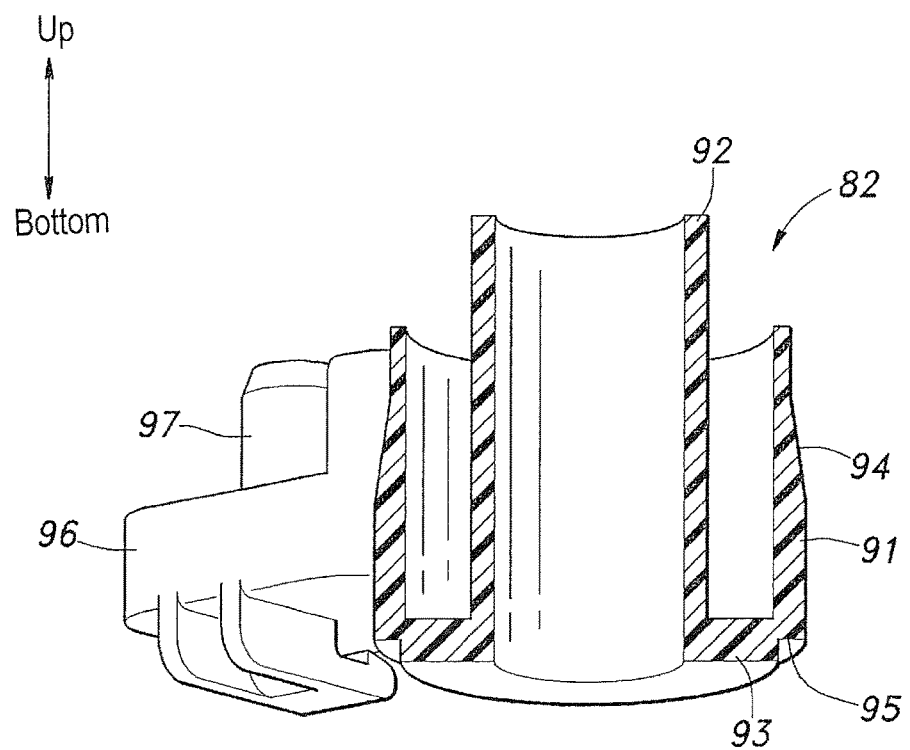
FIG. 10 is a cross-sectional perspective view of a link.

As shown in FIG. 7 and FIG. 10, the link 82 includes an outer cylinder 91 and an inner cylinder 92 extending in the up-and-down direction, and disposed concentrically; and a bottom plate 93 connecting both lower ends of the outer cylinder 91 and the inner cylinder 92. In an outer peripheral face of the outer cylinder 91, a diameter of an upper end side portion is reduced relative to a lower end side portion, and an interval between the upper end side portion and the lower end side portion becomes a conical surface 94 whose diameter gradually increases toward a lower end side. At a lowermost end portion of the outer cylinder 91, there is formed a locking concave portion 95 whose diameter is reduced on a different level along a circumferential direction. On the outer peripheral face of the outer cylinder 91, there is provided a pair of protruding pieces 96 respectively protruding outward in a radial direction at an interval of 180° in the circumferential direction. In each protruding piece 96, there is provided a columnar support shaft 97 protruding upward.

A lower end of the support shaft 86 is inserted from an upper end side of the inner cylinder 92, so that the inner cylinder 92 is rotatably supported in the support shaft 86, and the link 82 is supported in the support base 81. When the support shaft 86 is inserted into the inner cylinder 92, the locking claw 87 of the support base 81 slidingly contacts with the outer peripheral face of the outer cylinder 91, and the pair of side walls 84 is elastically deformed so as to open. When the locking claw 87 reaches the locking concave portion 95, the pair of side walls 84 returns to an original posture by a restoring force, and the locking claw 87 is locked in the locking concave portion 95. In the outer peripheral face of the outer cylinder 91, the diameter of the upper end side portion thereof is reduced relative to the lower end side portion, so that the outer cylinder 91 can easily enter between the pair of locking claws 87.

In a pair of support shafts 97 of the link 82, the locking holes 79 of the left lock member 61 and the right lock member 62 are pivotally supported respectively. A diameter of the support shaft 97 is smaller than that of the locking hole 79, and the support shaft 97 is loosely fitted into the locking hole 79. Thereby, when the left lock member 61 is displaced to a left side, the link 82 turns counterclockwise (hereinafter, a rotational direction is determined by the view from above) viewed from above around the support shaft 86 extending in the up-and-down direction of the support base 81, and the right lock member 62 is displaced into a right side. Also, when the left lock member 61 is displaced to a right side, the link 82 turns clockwise around the support shaft 86 of the support base 81, and the right lock member 62 is displaced to a left side.

The torsion coil spring 83 is disposed between the outer cylinder 91 and the inner cylinder 92 of the link 82, and while one end is locked in the link 82, the other end is locked in the support base 81, and the torsion coil spring 83 urges the link 82 in a counterclockwise rotational direction around the support shaft 86 relative to the support base 81. In the link 82 urged counterclockwise, the left lock member 61 is displaced to the left side, and the left-lock-member upper portion 66 abuts against the outer end of the drive member 29 of the actuator 21 in the crank portion.

As shown in FIG. 11(A), when the actuator 21 is located in the initial state, the drive member 29 is positioned in the most entered position, the left lock member 61 is moved to a left most side by the link 82 urged by the torsion coil spring 83, and the left lock claw portion 68 fits into a fit hole 101 which is a bottomed hole formed in the arm portion 12. Also, the right lock member 62 is moved to a most right side by the link 82, and the right lock claw portion 73 fits into a fit hole 101 which is the bottomed hole formed in the arm portion 12. The left lock claw portion 68 and the right lock claw portion 73 are fitted into the fit holes 101, so that the lid body 8 is maintained in a position where the box body 7 is closed. Namely, the lock device 20 comes into a lock state.

As shown in FIG. 11(B), when electricity is supplied to the actuator 21, and the drive member 29 moves to the most protruding position, the left lock member 61 is pressed by the drive member 29, and moves to the right side while rotating the link 82 clockwise against an urging force of the torsion coil spring 83. Thereby, the left lock claw portion 68 is disengaged from the fit hole 101. Also, the link 82 rotates clockwise, so that the right lock member 62 moves to the left side, and the right lock claw portion 73 is disengaged from the fit hole 101. The left lock claw portion 68 and the right lock claw portion 73 are disengaged from the fit holes 101, so that the lid body 8 can be freely opened and closed relative to the box body 7. Namely, the lock device 20 comes into an unlock state. In the glove box 1 according to the present embodiments, when the left lock claw portion 68 and the right lock claw portion 73 are disengaged from the fit holes 101, the lid body 8 opens by its own weight.

From a state shown in FIG. 11(B), the drive member 29 returns to the initial position by stopping a supply of electricity to the actuator 21, and the left lock member 61 is displaced to the left side, and the right lock member 62 is displaced to the right side by the link 82 urged by the torsion coil spring 83.

In the glove box 1 and the actuator 21 formed as above, the urging mechanism 30 urges the motor rotating shaft 27 to the initial position without passing through the worm wheel 34, so that the motor rotating shaft 27 can smoothly return to the initial position. Also, the urging mechanism 30 can rotate the motor rotating shaft 27 into the initial position by a force smaller than that in a case of urging the worm wheel 34 so as to reduce the size, and the size of the actuator 21 can be reduced.

Specific embodiments have been explained in the above; however, the present invention is not limited to the aforementioned embodiments, and can be widely modified. For example, in the aforementioned embodiments, the flat spiral spring 41 is connected to the motor rotating shaft 27 through the first gear 38 and the second gear 39; however, the flat spiral spring 41 may be directly connected to the motor rotating shaft 27. In the present embodiments, the lock mechanism 22 is formed by the right-and-left lock members 61 and 62, and the link mechanism 63; however, in another embodiment, the right lock member 62 and the link mechanism 63 may be omitted.

EXPLANATION OF SYMBOLS

1 . . . a glove box, 7 . . . a box body, 8 . . . a lid body, 12 . . . an arm portion, 20 . . . a lock device, 21 . . . an actuator, 22 . . . a lock mechanism, 26 . . . an electric motor, 27 . . . a motor rotating shaft, a power transmission mechanism, 29 . . . a drive member, 30 an urging mechanism, 33 . . . a worm, 34 . . . a worm wheel, 35 . . . a pinion, 36 . . . a rack, 38 . . . a first gear, 39 . . . a second gear, 41 . . . a flat spiral spring, 43 . . . a first stopper, 46 . . . a convex wall, 47 . . . a second stopper, 61 . . . a left lock member, 62 . . . a right lock member, 63 . . . a link mechanism, 68 . . . a left lock claw portion, 73 . . . a right lock claw portion, 81 . . . a support base, 82 . . . a link, 83 . . . a torsion coil spring, 101 . . . a fit hole

What is claimed is:
1. A glove box, comprising:
an actuator including:
    an electric motor including a motor rotating shaft extending outwardly, and rotating the motor rotating shaft in one rotation direction,
    a power transmission mechanism including a worm formed on the motor rotating shaft of the electric motor, and a worm wheel engaging with the worm and having a pinion member coaxially formed therewith and a convex wall protruding outwardly therefrom,
    a drive member including a rack portion engaging the pinion member to be connected to the motor rotating shaft through the power transmission mechanism, and moved according to a rotation of the motor rotating shaft,
    a control device including a first stopper arranged at one side of the drive member and a second stopper arranged on a movement path of the convex wall, and stopping the rotation of the motor rotating shaft in cooperation with the drive member and the convex wall, and an urging device connected to the motor rotating shaft, and urging the motor rotating shaft to rotate the motor rotating shaft in another rotation direction opposite to the one rotation direction;

a lock mechanism including:
  a first lock member contacting the drive member to be moved by the drive member of the actuator,
  a second lock member spaced from the first lock member, and
  a link mechanism arranged between the first lock member and the second lock member to link the first lock member and the second lock member, and moving the second lock member in a direction opposite to a movement of the first lock member, the link mechanism including a support base, a link member rotatably supported in the support base, and a torsion coil spring interposed between the support base and the link member and urging the link member in one direction;

a box body having an opening at one portion thereof and fit holes formed at side portions thereof; and a lid body rotatably connected to the box body to open and close the opening of the box body, wherein in a case in which electricity is supplied to the electric motor, and the electric motor is driven, the motor rotating shaft is rotated against an urging force of the urging device and drives the worm wheel in a direction to approach the convex wall to the second stopper until the convex wall contacts the second stopper, and when the convex wall contacts the second stopper, the drive member protrudes outwardly to press the first lock member, and the first lock member and the second lock member move in directions approaching to each other through the link mechanism against an urging force of the torsion coil spring, and in a case in which the electricity is not supplied to the electric motor, the motor rotating shaft is reversely rotated by the urging force of the urging device to move the drive member through the worm wheel until the drive member contacts the first stopper, and when the drive member contacts the first stopper, the first lock member and the second lock member move in directions apart from each other through the link mechanism with the urging force of the torsion coil spring, and the first lock member presses the drive member to contact the first stopper;

the first lock member includes a first lock claw portion at one end thereof to be engaged into one of the fit holes, and the second lock member includes a second lock claw portion at one end thereof to be engaged into the other of the fit holes;

when the convex wall contacts the second stopper and the drive member protrudes outwardly to press the first lock member, the first lock claw portion and the second lock claw portion are disengaged from the fit holes, and when the drive member contacts the first stopper and the first lock member presses the drive member to contact the first stopper with the urging force of the torsion coil spring, the first lock claw portion and the second lock claw portion are engaged into the fit holes;

the support base includes an upper wall, a pair of side walls extending downwardly from the upper wall, a columnar support shaft extending downwardly from the upper wall inside the pair of side walls, and locking claws protruding inwardly from lower ends of the pair of side walls;

the link member includes a bottom plate, an inner cylinder portion to fit the columnar support shaft thereinside, an outer cylinder portion outside the inner cylinder portion, the inner cylinder portion and the outer cylinder portion being disposed coaxially on the bottom plate and extending upwardly from the bottom plate, locking concave portions concaved from a lower surface of the bottom plate to engage the locking claws, and a pair of protruding pieces protruding outwardly from the bottom plate to engage the first lock member and the second lock member; and the torsion coil spring is arranged between the outer cylinder portion and the inner cylinder portion, and one end of the torsion coil engages the support base and the other end of the torsion coil engages the link member.

2. A glove box according to claim 1, wherein the urging device includes a first gear connected to the motor rotating shaft;
  a second gear engaging with the first gear; and
  a spring rotationally urging the second gear.

3. A glove box according to claim 2, wherein the motor rotating shaft has a first end connected to the electric motor and a second end connected to the first gear, and the worm is formed between the first end and the second end, and
  the second gear is provided on a side opposite to the worm wheel relative to a shaft line of the motor rotating shaft.

4. A glove box according to claim 2, wherein the spring is a flat spiral spring.

5. A glove box according to claim 1, wherein the urging device is a spring connected to the motor rotating shaft, and rotating and urging the rotating shaft.

6. A glove box according to claim 1,
  wherein the actuator and the lock mechanism are attached to the lid body; and
  the fit holes are formed in the box body to fit the first lock member and the second lock member.

7. A glove box according to claim 6, wherein the first lock member has a crank portion to form a space in which the actuator is arranged, and the drive member contacts the crank portion when the actuator is driven.

8. A glove box according to claim 1, further comprising a casing to which the first stopper and the second stopper are fixed,
  wherein the worm wheel is engaged with the worm and the drive member such that the drive member is moved to protrude one end portion thereof from a side portion of the casing when the worm wheel is rotated in the direction to approach the convex wall to the second stopper, and the drive member is moved to contact the first stopper in the casing when the worm wheel is rotated in a direction to separate the convex wall from the second stopper.

* * * * *